United States Patent [19]

Ban et al.

[11] 4,342,884
[45] Aug. 3, 1982

[54] PISTON UNIT

[76] Inventors: Itsuki Ban, 829, Higashi, Oizumi-machi, Nerima-ku, Tokyo; Hidenori Kanno, 694-11, Yagigaya-cho, Funabashi-shi, Chiba-ken, both of Japan

[21] Appl. No.: 47,047

[22] Filed: Jun. 11, 1979

[30] Foreign Application Priority Data

| | | | |
|---|---|---|---|
| Jun. 14, 1978 | [JP] | Japan | 53-70975 |
| Jul. 18, 1978 | [JP] | Japan | 53-86695 |
| Sep. 26, 1978 | [JP] | Japan | 53-131262[U] |
| Oct. 19, 1978 | [JP] | Japan | 53-127848 |
| Nov. 14, 1978 | [JP] | Japan | 53-155724[U] |
| Dec. 26, 1978 | [JP] | Japan | 53-159365 |

[51] Int. Cl.³ ............... H01H 7/03; H01H 35/38
[52] U.S. Cl. ............... 200/34; 200/83 A; 200/83 J; 200/83 Q; 200/83 T; 267/114; 267/124; 267/8 R; 188/282; 188/322.17; 188/298
[58] Field of Search ............... 200/34, 83 R, 83 A, 200/83 B, 83 D, 83 J, 83 Q, 83 T; 267/114, 122, 123, 124, 8 R; 188/282, 297, 298, 311–313, 316, 322.17; 74/18.2

[56] References Cited

U.S. PATENT DOCUMENTS

| | | | |
|---|---|---|---|
| 1,152,433 | 9/1915 | Murphy | 200/34 |
| 2,562,286 | 7/1951 | Wall | 200/34 X |
| 2,881,285 | 4/1959 | Bank | 200/34 |
| 2,950,499 | 8/1960 | Schlage | 267/122 X |
| 3,639,711 | 2/1972 | Jordan et al. | 200/34 X |
| 3,711,222 | 1/1973 | Hartley | 200/83 J |
| 3,789,949 | 2/1974 | Bortfield et al. | 200/83 J X |
| 3,839,609 | 10/1974 | Prjpers | 200/83 B |

FOREIGN PATENT DOCUMENTS

| | | | |
|---|---|---|---|
| 568091 | 12/1932 | Fed. Rep. of Germany | 200/34 |
| 687531 | 3/1965 | Italy | 200/83 J |
| 550924 | 2/1943 | United Kingdom | 200/34 |

*Primary Examiner*—S. J. Witkowski
*Attorney, Agent, or Firm*—Steinberg & Raskin

[57] ABSTRACT

A small-sized differential piston unit is disclosed. The piston unit has a cylinder filled with liquid medium and a piston slideably mounted in the cylinder. An operation rod is operatively connected to said piston. An improved sealing member consisting of a membrane is used to completely seal the liquid medium in the cylinder. Control means is provided for imparting fluid resistance caused by the liquid medium to the piston differently between its forward movement and backward movement in the cylinder.

18 Claims, 39 Drawing Figures

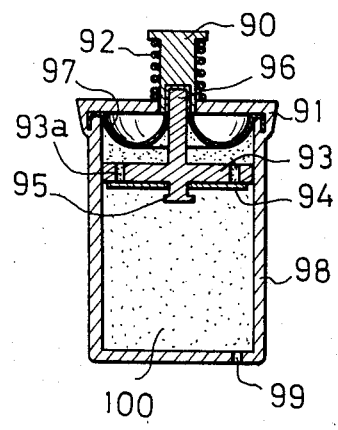
FIG. 15
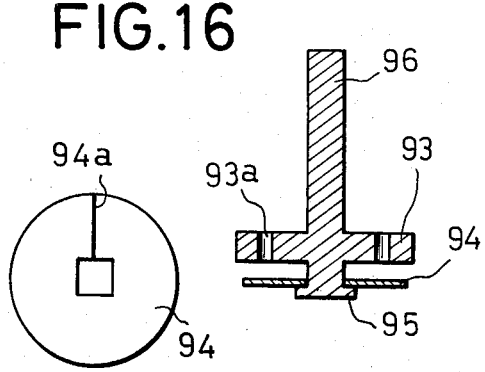
FIG. 16    FIG. 18
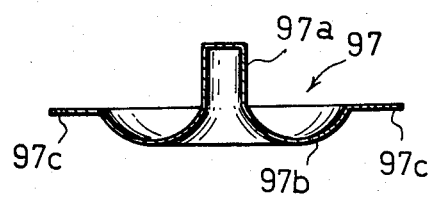
FIG. 17
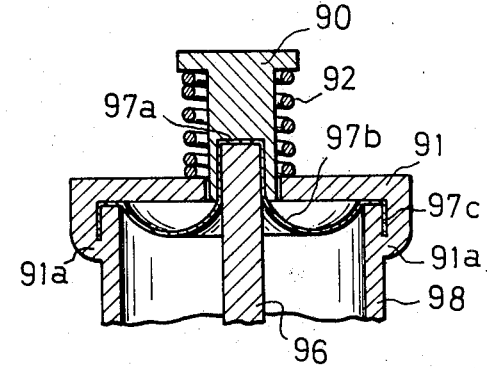
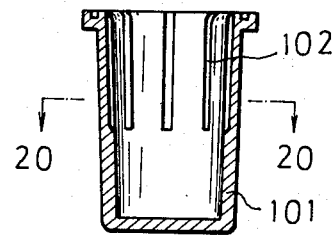
FIG. 19    FIG. 20
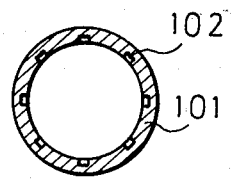

PISTON UNIT

BACKGROUND OF THE INVENTION

The present invention relates to a piston unit adapted to be controlled by liquid pressure and, more particularly, to a small-sized piston unit having a piston reciprocatively displaceable in a cylinder filled with liquid, wherein the piston is subjected to different fluid resistances caused by the liquid when it makes forward and backward movements over a predetermined stroke within the cylinder, so that the piston may displace at different stroke speeds in its forward and backward movements.

Generally, in the design and construction of this kind of device, it is essential to avoid leakage of the liquid filling the cylinder, e.g. water, oil or the like, to the outside of the device. Particularly, it is important to prevent the liquid from leaking through the sliding portion between the cylinder and the piston rod which is connected to the piston.

A typical conventional measure for preventing the leakage of the liquid is to provide sealing members such as "O" rings in the portion of the cylinder where it slideably embraces the piston rod. With this measure, however, it is impossible to perfectly seal the internal liquid, because the pressure of the liquid in the cylinder is increased considerably due to the reciprocation of the piston in the cylinder thereby causing the liquid to leak through the portion of the cylinder slideably embracing the piston rod.

SUMMARY OF THE INVENTION

Generally speaking, according to the present invention, there is provided a small-sized piston unit containing a liquid therein, capable of perfectly preventing the leakage of the internal liquid to the outside of the cylinder. This piston unit has a cylinder and a piston slideably mounted therein. An operation rod is operatively connected to the piston. A seal member is employed for sealing the inside of the cylinder including the piston therein. The cylinder is charged with a liquid. In addition, means are provided so that the liquid can impart different flow resistances to the piston between its forward and backward movements.

In a preferred embodiment of the present invention, the seal member is made of a flexible membrane made of a synthetic or natural rubber, plastic film, metal foil, or a laminated film formed by two or more of the above-mentioned materials. The arrangement is such that the operation rod forces the piston to displace in the cylinder from the outside of the cylinder through the membrane. The outer circumferential edge of this membrane is fixed liquid-tightly by the cylinder and a cylinder cap attached thereto.

The liquid with which the cylinder is charged is, preferably, silicon oil having a high viscosity and a small temperature coefficient, deaerated water, or a mixture of water and ethylene glycol. The silicon oil can ensure a comparatively stable operation of the device against the variation of temperature. However, according to the present invention, means are provided for further stabilizing the operation of the device against the variation of temperature.

The piston in the cylinder is normally urged in one direction, and is adapted to be displaced against the urging force when an external force is applied through the operation rod. When this external force is released, the piston is allowed to return to the reset position by the urging force.

As the means for urging the piston, various constructions can be adopted, such as mounting a coiled spring at a suitable position, or forming wrinkles in the flexible membrane.

There is also provided a mechanism for imparting a small fluid resistance when the piston is displaced by the external force and a large fluid resistance during resetting displacement of the piston. Alternatively, the mechanism may be such that a large fluid resistance is imparted during displacement of the piston by the external force and a small fluid resistance during resetting displacement of the piston.

In the former case, the device can be used as a timer which is reset after elapse of a predetermined time, while in the latter case, the invention also finds wide use such as a small-sized damper for attenuating the shock. For instance, it is possible to obtain a timer switch making no use of electronic circuit, in which a switch is operated to open and close a circuit by making use of the movement of the piston.

The mechanism for causing the different fluid resistance can have various constructions. For instance, the mechanism may be constituted by a combination of a through bore formed on the piston and a check valve disposed on the through bore. As an alternative, a combination of a through bore formed on the wall of the cylinder and a check valve disposed on the through bore may be used as the mechanism for causing the different fluid resistance. These mechanisms make it possible to obtain a small-sized device of this kind.

It is therefore a main object of the present invention to provide an improved piston unit adapted to be controlled by a liquid contained therein.

It is another object of the invention to provide a piston unit which is free from the problem of the leakage of the working liquid even after a long period of use.

It is still another object of the invention to provide a piston unit which is small-sized and suitable for mass production.

It is a further object of the invention to provide a piston unit capable of performing a stable operation even when the ambient temperature is changed.

It is a still further object of the invention to provide a piston unit which has a simple construction and is not expensive.

It is a still further object of the invention to provide a timer switch, making use of no electronic circuit.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE INVENTION

For a fuller understanding of the invention, reference is had to the following descriptions taken in connection with the accompanying drawings, in which:

FIG. 15 is a front elevational sectional view of an improved piston unit which is a still further embodiment of the invention;

FIG. 16 is an illustration of a piston and a valve member incorporated in the piston unit shown in FIG. 15;

FIG. 17 is an illustration of a seal member incorporated in the piston unit shown in FIG. 15;

FIG. 18 is an enlarged sectional view of a part of the piston unit shown in FIG. 15;

FIG. 19 is a front elevational sectional view of another example of the cylinder as used in the improved piston unit in accordance with the invention;

FIG. 20 is a sectional view taken along the line 20—20 of FIG. 19;

DETAILED DESCRIPTION OF THE PREFERRED EMBODIMENTS

Figure 1:
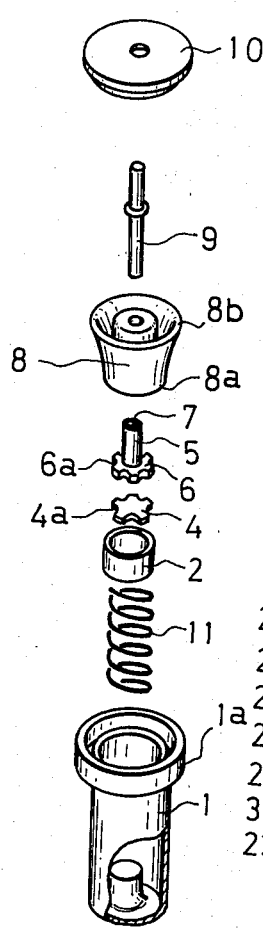
FIG. 1 is an exploded view of an improved piston unit in accordance with the invention.
Figure 2:
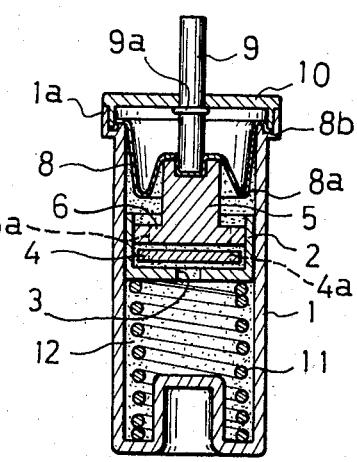
FIG. 2 is a front sectional elevational view of the unit shown in FIG. 1 in the assembled state.

Referring first to FIGS. 1 and 2, a cylinder 1 has a columnar shape having a recessed end, and slideably mounts a piston 2 therein. The piston 2 has an annular shape with one end closed, and a through bore 3 is formed at the center portion of the closed end. A valve member 4 adapted to open and close the through bore 3 is mounted on the piston 2. The valve member 4 has a peripheral groove 4a through which is passed a hereinafter-mentioned liquid 12 when it flows through the through bore 3 of the piston 2.

The piston 2 is provided with a piston rod 5 connected at its one end 6 so as to loosely retain the valve member 4 therebetween.

As will be clearly seen from FIG. 1, in the peripheral surface of the end 6 of the piston rod 5 is formed a groove 6a which constitutes a passage for the liquid 12, while, in the other end of the piston rod, is formed a fitting bore 7. To the end of the piston rod 5 where the fitting bore 7 is formed, is fitted a membrane 8 made of a flexible material such as synthetic rubber at the central part thereof. An operation rod 9 is firmly fitted through the membrane 8 to the fitting bore 7 of the piston rod 5.

This operation rod 9 is slideably fitted to a cylinder cap 10, and is provided at its suitable portion with a stopper 9a for limiting the stroke of the piston 2.

The membrane 8 has a corrugated portion 8a to follow the change of volume caused by the flow of the liquid 12. The outer circumferential edge 8b of the membrane 8 is crimped liquid-tightly between the upper edge 1a of the cylinder 1 and the cylinder cap 10. Thus, the membrane 8 is continuous at its mid portion and is liquid-tightly crimped and fixed at its outer peripheral portion by the upper edge 1a of the cylinder 1 and the cylinder cap 10, so that any leakage of the liquid is perfectly prevented.

At the same time, a coiled spring 11 is interposed between the inner bottom surface of the cylinder 1 and the end surface of the piston 2 so as to urge the piston upwardly as viewed in FIG. 2.

The liquid charged in the cylinder 1 and sealed by the membrane 8 is preferably silicon oil which exhibits a comparatively small change of viscosity in relation to the change of temperature. However, the silicon oil is expensive, so that it is desirable to reduce the amount of silicon oil used in the piston unit. To this end, the bottom of the cylinder 1 is recessed as illustrated. This also contributes to the reduction of the production cost in the mass-production of the unit.

The liquid 12 is filled into the cylinder 1 through an inlet port which is not shown.

As the piston 2 is depressed downward by an external force applied through the operation rod 9, the valve member 4 opens the through bore 3 so as to reduce the fluid resistance caused by the liquid 12. On the contrary, when the piston 2 is reset to the upper position by the urging force exerted by the spring 11, the valve member 4 closes the through bore 3. In the latter case, the liquid 12 is allowed to flow only through the annular gap between the piston 2 and the cylinder 1, and therefore the fluid resistance is remarkably increased.

Thus, in this embodiment, mechanism for causing the different fluid resistances of the liquid 12 against the piston 2 are constituted solely by the piston 2 and the valve member 4.

Figure 3:
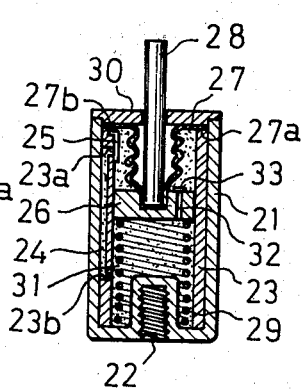
FIG. 3 is a front sectional view of a piston unit having a valve mechanism incorporated in the cylinder wall.

FIG. 3 shows another embodiment in which the mechanism for causing the different fluid resistances is incorporated in the inner wall of the cylinder. At the bottom of a columnar cylinder 21 is formed a recess as in the case of the first embodiment. A threaded portion 22 is provided in this recessed bottom in order to facilitate the attaching of the unit of the invention to another member or device. An inner sleeve or a cylinder liner 23 is received in the cylinder 21.

Figure 4:
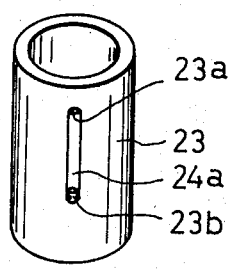
FIG. 4 is a perspective view showing a cylinder liner of the piston unit shown in FIG. 3.

In the cylinder liner 23, an elongated groove 24a is formed for cooperating with the cylinder 21 in defining a passage 24 for the liquid 31, as shown also in FIG. 4. Through bores 23a and 23b are formed at respective ends of the elongated groove 24a. The inner sleeve 23 slideably mounts a piston 26 therein. A valve member 25 for opening and closing the through bore 23a is disposed above the stroke end of the piston 26.

Figure 5:
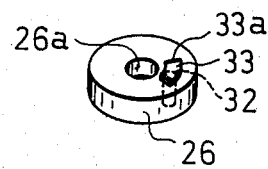
FIG. 5 is a perspective view showing a piston of the piston unit shown in FIG. 3.

As shown in FIG. 5, a fitting bore 26a is formed at the center of the piston 26. An operation rod 28 which is slideably received by a cylinder cap 30 is firmly fitted to the fitting bore 26a of the piston 26 through a membrane 27 constituted by a plastic film. The outer edges 27a, 27b of the membrane 27 are crimped in a liquid-tight manner between the upper edge of the cylinder liner 23 and the cylinder cap 30, so that any leakage of the liquid 31 out of the cylinder 21 is perfectly prevented.

The piston 26 is upwardly urged by means of a coiled spring 29 as viewed in the Figure. As an external force is applied to the piston 26 through the operation rod 28, the piston 26 is displaced downwardly overcoming the force of the spring 29.

Also, in the described embodiment, a small bore 32 is formed at a portion of the piston 26. As shown in FIG. 5, a bimetal 33 is attached to the upper side of the piston 26 at a portion 33a thereof so as to overlie the small bore 32, in order to adjust the opening area of the small bore 32 depending on the variation of the temperature. More specifically, when the viscosity of the liquid 31 is decreased due to a temperature rise, the small bore 32 is closed by the bimetal 33, whereas, when the viscosity of the liquid 31 increases due to a fall of the temperature, the bimetal 33 allows the small bore 32 to open. Therefore, the resetting time, i.e. the time required for the piston to displace a predetermined stroke to the starting or resetting position, is maintained constant irrespective of the change in the ambient temperature.

It will be understood by those skilled in the art that, according to this embodiment, it is possible to easily change the gap between the cylinder 21 and the piston 26 by changing the inside diameter of the cylinder liner 23, which in turn permits the production of piston units having a variety of resetting times.

Figure 6:
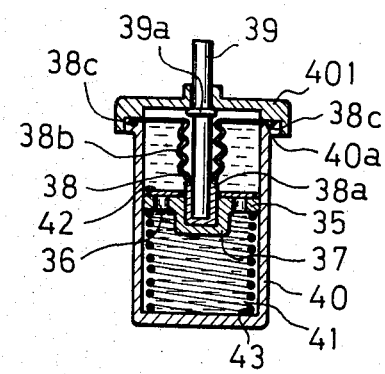
FIG. 6 is a front elevational sectional view showing another embodiment of a piston unit according to the invention.

FIG. 6 shows still another embodiment of the invention. The piston 35 of this embodiment has a plurality of through bores 36, and at the center of which is formed a recess 37. This recess 37 has a columnar shape and is adapted to receive the thick-wall part 38a of a membrane 38 made of synthetic rubber. Further, the end of the operation rod 39 is fitted firmly to this recess 37 through the medium of the thickwall part 38a of the membrane 38. The membrane 38 has a thin-walled corrugated part 38b continuous from the thickwalled part 38a and a bead portion 38c formed at the circumferential end of the corrugated portion 38b. The bead portion 38c is crimped liquid-tightly between the open end 40a of the cylinder 40 and a cylinder cap 401 so as to seal the silicon oil 41 which has been introduced into the cylinder 40 through an inlet which is not shown.

Thus, in this embodiment, the membrane 38 has an integral construction consisting of the thick-walled part 38a, corrugated part 38b and the bead portion 38c, so that a perfect seal of the cylinder 40 is attained by simply crimping the bead portion 38c. This permits an easy assembling of the piston unit.

At the same time, a plate-shaped valve member 42 is attached to the upper surface of the piston 35 so as to open and close the through bores 36 formed on the piston 35.

Figure 7B:
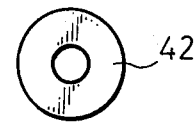
FIG. 7B is a plan view showing a valve member of the piston unit shown in FIG. 6.
Figure 7A:
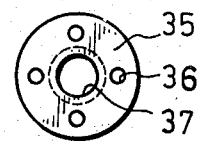
FIG. 7A is a plan view showing the piston of the piston unit shown in FIG. 6.

The piston 35 and the plate-shaped valve member 42 are shown more clearly at FIGS. 7A and 7B. As stated before, a plurality of through bores 36 are formed on the piston 35, and the valve member 42 is disposed to overlie these through bores 36. A reference numeral 43 denotes a coiled spring adapted to urge the piston 35 upward as viewed in the drawing.

As the piston 35 is moved downward, the valve member 42 allows the through bores 36 to open to reduce the fluid resistance. On the other hand, during the upward displacement of the piston 35, the valve member 42 closes the through bores 36, so that the fluid resistance of the silicon oil 41 is increased because in this case the silicon oil 41 has to flow through the annular gap between the piston 35 and the cylinder 40.

Thus, in this embodiment, the mechanism for causing different fluid resistance is constituted by the piston 35, through bores 36 and the valve member 42.

In this embodiment, the portion of the operation rod 39 above the stopper 39a has a polygonal cross-section, so that the operation rod 39 is prevented from rotating relative to the cylinder cap 401, although it is allowed to freely slide in the vertical direction. By constructing the operation rod 39 in the manner described, only a vertical movement is imparted to the membrane 38 to prevent the twisting thereof. In consequence, the membrane 38 can serve a longer time without breakage.

Figure 8:
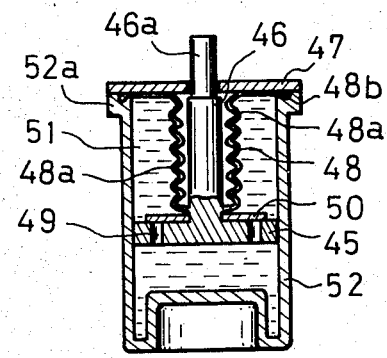
FIG. 8 is a front elevational sectional view of an improved piston unit which is still another embodiment of the invention.
Figure 9:
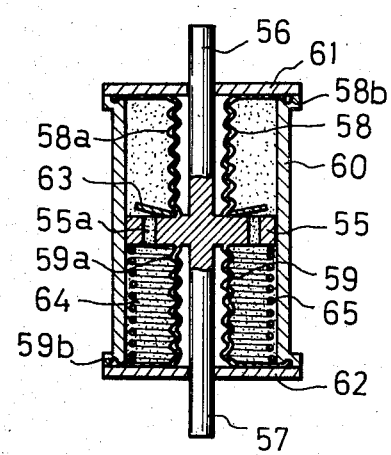
FIG. 9 is a front elevational sectional view of an improved piston unit which is a further embodiment of the invention.
Figure 10:
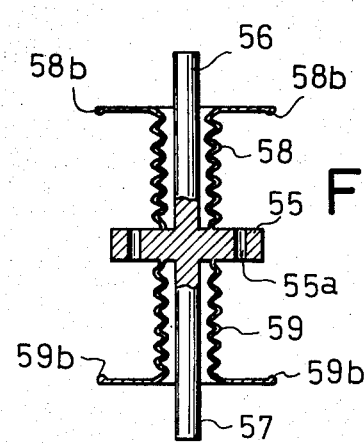
FIG. 10 is an illustration of a piston member incorporated in the piston unit shown in FIG. 9.

FIGS. 8 to 10 show different embodiments of the invention.

Referring to the embodiment shown in FIG. 8, a piston 45 has an operation rod 46 of a comparatively large diameter extending unitarily therefrom. The end 46a of the operation rod 46 has a slightly reduced diameter, and is slideably received by a bore of a cylinder cap 47 to extend outwardly from the latter. Thus, the stroke of the piston 45 is determined by the abutment of the larger-diameter portion of the operation rod 46 with the inner surface of the cylinder cap 47. Further, a membrane 48 made of synthetic rubber is formed unitarily with the piston 45 to enclose the operation rod 46. A plurality of corrugations or wrinkles 48a are regularly formed on the membrane 48 so as to exhibit a uniform deformation in accordance with the vertical movement of the piston 45.

The membrane 48 has a comparatively large thickness to exhibit a sufficiently large resetting resilient force so as to play the role of the coiled spring in the embodiments described before.

As in the case of the foregoing embodiments, the outer circumferential edge portion 48b of the membrane 48 is crimped liquid-tightly between the end 52a of the cylinder 52 and the cylinder cap 47.

As the operation rod 46a is depressed by an external force, the small bore 49 of the piston 45 is opened to allow the downward movement of the piston 45 with a small fluid resistance. Then, as the operation rod 46a is released from the depressing force, the bore 49 is closed by the valve member 50 as is the case of the embodiment shown in FIG. 6, so that a larger fluid resistance is imparted to the piston 45 and the resetting of the piston 45 by the resilient force exerted by the membrane 48 is made gradually.

In the embodiment shown in FIG. 9, first and second operation rods 56, 57 are unitarily formed on the upper and lower surfaces of a piston 55. A first membrane 58 and a second membrane 59 are formed also unitarily with the piston 55 so as to enclose the first and the second operation rods 56, 57. Namely, the piston 55, first operation rod 56, second operation rod 57, first membrane 58 and the second membrane 59 are formed integrally in the form as shown in FIG. 10.

As in the case of the embodiment shown in FIG. 8, both of the first and the second membranes 58, 59 are provided with regularly corrugated portions 58a, 59a, the outer circumferential edges 58b, 59b of which are crimped liquid-tightly between a first cylinder cap 61 and the cylinder 55, and between a second cylinder cap 62 and the cylinder 55, respectively.

In this Figure, the reference numeral 55a denotes a through bore formed on the piston 55, while the numeral 63 denotes a valve member. The silicon oil charged in the cylinder and the coiled spring are designated by reference numerals 64 and 65, respectively.

If the spring 65 is interposed between the piston 55 and the second cylinder cap 62, the piston 55 is urged upward as viewed in the drawings. Then, as the first operation rod 56 is depressed, the valve member 63 allows the bore 55a of the piston 55 to open, so that the piston 55 can move with a small fluid resistance. The bore 55a is closed as the first operation rod 56 is freed from the depression force, so that the resetting of the piston 55 by the urging force of the spring 65 is encountered by a large fluid resistance and, therefore, is made gradually.

On the other hand, if the spring 65 is interposed between the piston 55 and the first cylinder cap 61, the bore 55a is closed when the second operation rod 57 is depressed to cause a large fluid resistance to the movement of the piston 55. However, in the resetting stroke of the piston 55, the bore 55a is allowed to open to reduce the fluid resistance, so that the piston 55 can move at a comparatively high speed.

It will be seen to those skilled in the art that this embodiment can act as either a timer or a damper, by changing the position of mounting of the spring 65.

Figure 11:
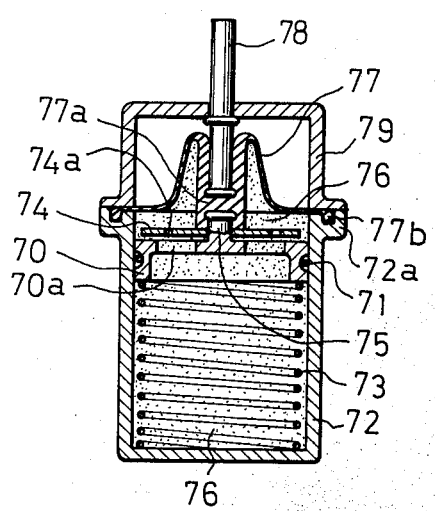
FIG. 11 is a front elevational sectional view of an improved piston unit which is a still further embodiment of the invention.

In the embodiment shown in FIG. 11, a piston ring 71 made of rubber is provided in the peripheral surface of the piston 70 so as to reduce the annular gap between the piston 70 and the inner peripheral wall of the cylinder 72. At the same time, a spring 73 is interposed between the cylinder 72 and the piston 70, as in the case of the embodiments described before. A comparatively large bore 70a is formed in the piston 70. A plate-shaped valve member 74 is loosely fitted to a piston rod 75 which is formed unitarily with the piston 70, so as to open and close the bore 70a. A small bore 74a of a diameter considerably smaller than that of the bore 70a is formed in the valve member 74 in opposition to the bore 70a. The small bore 74a is adapted to allow the liquid 76 filling the cylinder 72 to flow downwardly therethrough, even when the bore 70a is closed by the valve member 74. The thick-walled part 77a of a membrane 77 covers the end of the piston rod 75, and the operation rod 78 is firmly supported through the medium of the thick-walled part 77a. On the other hand, the outer peripheral portion 77b of the membrane 77 is crimped between a crimping rib 72a formed on the cylinder 72 and a cylinder cap 79 so as to seal the space in the cylinder 72 from the outside. The liquid 76 with which the cylinder 72 is filled is a silicon oil which exhibits a comparatively small change of viscosity in relation to the change of temperature.

Figure 12:
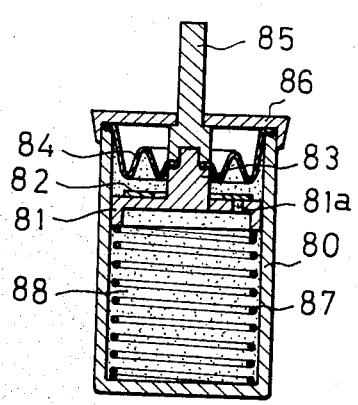
FIG. 12 is a front elevational sectional view of an improved piston unit which is a still further embodiment of the invention.
Figure 13:
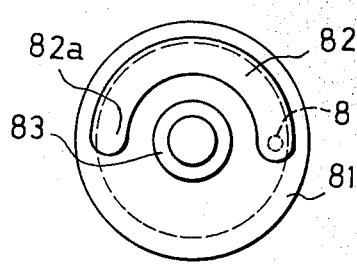
FIG. 13 is a plan view of the valve actuating mechanism of the piston unit shown in FIG. 12.
Figure 14:
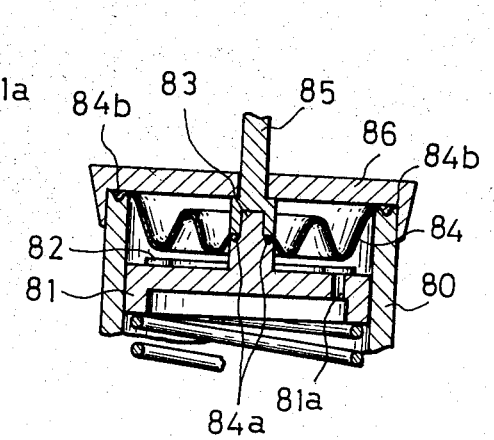
FIG. 14 is an enlarged sectional view of a part of the piston unit shown in FIG. 12.

In the embodiments shown in FIGS. 12 to 14, a cylinder 80 is shaped from plastic and slideably mounts a piston 81 therein. The outer peripheral surface of the piston 81 is axially elongated in the form of a column as illustrated in the Figures, so as to contact with the inner surface of the cylinder 80 in a large contact area to ensure a stable sliding displacement of the piston 81.

A bore 81a is formed on a part of the piston 81. Also, a flexible plate-shaped valve 82 is attached to a position where it opposes the bore 81a. More specifically, as shown in FIG. 13, an arc-shaped valve 82 is fixed at its one end 82a to a part of the piston 81 by means of a welding caused by, for example, ultrasonic wave, while the other end is kept free and opposed by the bore 81a. In this embodiment, the valve 82 is disposed on the upper surface of the piston 81, so that the piston 81 is encountered by a small fluid resistance when it is depressed by external force through an operation rod 85, but is subjected to a large fluid resistance when it is reset by the urging force of a spring 87 disposed in the cylinder 80. However, as will be clear to those skilled in the art, if the valve is attached to the lower surface of the piston 81, the fluid resistance is large during movement of the piston 81 by the external force and small when the piston 81 is returned by the force of the spring 87.

A piston rod 83 is unitarily extended from the center of the piston 81. To the end of the piston rod 83, fitted firmly is the operation rod 85 through the medium of an inner bead portion of the membrane 84. Namely, as shown in FIG. 14, the end of the piston rod 83 is stepped, and the portion contacted by the inner bead 84a of the membrane 84 is recessed to provide a larger contact area. The piston rod 83 and the end of the operation rod 85 are fitted to each other in a liquid-tight manner so as to crimp the inner bead 84*a* of the membrane 84 therebetween. At the same time, the outer peripheral surface of the end portion of the piston rod 83 is welded to the inner peripheral surface of the operation rod 85 by means of ultrasonic waves.

The crimped inner bead portion 84*a* extends from a corrugated part on the other end of which is formed an outer bed portion 84*b* to be pressed onto the end surface of the cylinder 80. The end surface of the cylinder 80 to be contacted by the outer bead portion 84*b* is recessed so as to receive a cylinder cap 86 with the outer bead 84*b* interposed therebetween. The cylinder 80 and the cylinder cap 86 are securely welded to each other by means of ultrasonic waves.

In this embodiment, a mixture 88 consisting of ethylene glycol and water preferably fills the space between the membrane and the cylinder 80. The mixing ratio thereof may optionally be selected. More specifically, the ratio of mixing is almost half and half by volume. Preferably, the ratio of ethylene glycol to water by volume is 55:45. The mixture 88 exhibits a characteristic, although depending on the mixing ratio, that the viscosity is not largely changed in relation to the change of temperature. Particularly, this mixture 88 permits the use of the piston unit of the invention in cold regions, and effectively prevents the corrosion or deterioration of the membrane 84.

In addition, since the ethylene glycol exhibits a hydrophilic nature and is apt to absorb the moisture from the outside, little volume change of the mixture 88 takes place even when the water content thereof is evaporated during long use. Thus, the piston unit of this embodiment offer advantages of reduced cost and stabilized operation for a longer period.

The embodiment shown in FIGS. 15 to 18 is constructed to exhibit a larger fluid resistance during the movement by the external force than in the resetting stroke.

In this embodiment, a coiled spring 92 is interposed between an operation rod 90 and a cylinder cap 91 so as to upwardly urge the piston 93. A bore 93*a* is formed in the piston 93. A plate-shaped flexible valve member 94 is attached to the lower face of the piston 93 so as to open and close the bore 93*a*. This arrangement is more fully shown in FIG. 16. Namely, the valve member 94 is supported by a supporting portion 95 which is formed unitarily with the piston 93 and the piston rod 96. The piston rod 96 has a polygonal cross-section, while a bore of polygonal shape corresponding to the cross-section of the piston rod 96 is formed at the center of the valve member 94. Thus, a slit 94*a* is formed in the valve member 94 to allow the attaching thereof to the piston rod 96, and the valve member 94 is prevented from rotating once it is attached thereby to prevent the slit 94*a* from being in alignment with the bore 93*a*.

As shown in FIG. 17, the central portion 97*a* of the membrane 97 covering the piston rod 96 has an increased thickness to have a larger hardness and the corrugated portion 97*b* continuous from the central portion 97*a* has a good flexibility. An outer circumferential edge portion 97*c* is continuous from the corrugated portion 97*b*. These three portions are shaped unitarily from a synthetic rubber.

As shown in FIG. 18, the membrane 97 covers the piston rod 96 at its central portion. In addition, the operation rod 90 is fitted securely to the piston rod 96 through the medium of the central portion 97*a* of the membrane 97. Meanwhile, the outer edge portion 97*c* of the membrane 97 is fixed by the cylinder cap 91 onto the end of the cylinder 98. The cylinder cap 91 is welded to the cylinder 98 at its contacting area 91*a* so as to perfectly seal the inside of the cylinder 98.

As shown in the drawings, the cylinder cap 91 is extended nearly to the outer surface of the operation rod 90 which is fixed to the upper end of the piston rod 96 through the medium of the membrane 97 so as to constitute the sliding surface for the operation rod 90 and to protect the membrane 97. A liquid 100 such as silicon oil is charged into the thus sealed cylinder 98 through an inlet 99 (FIG. 15). After the charge of the cylinder 98 with this liquid 100, the inlet port 99 is closed by heat welding.

FIGS. 19 and 20 show an example of the cylinder usable as the cylinder of the piston unit in accordance with the invention. The cylinder shown in these Figures may be substituted for the cylinders of the embodiments hereinbefore described.

As will be seen from these Figures, the cylinder 101 is slightly tapered. A description will be made hereinafter as to an application of this cylinder to the embodiment shown in FIG. 6. When the spring 43 is largely compressed, the gap between the piston 35 and the cylinder 101 is comparatively small thereby causing a comparatively large fluid resistance against the movement of the piston 35. On the contrary, when the piston 35 is moved upward, the gap between the piston 35 and the cylinder 101 is gradually increased. However, since the urging force of the spring 43 is gradually decreased, the piston 43 may be allowed to make a movement substantially at a constant speed.

Further, a plurality of grooves 102 are formed on the inside of the upper portion of the cylinder 101, at the stroke end of the piston 35 mounted in the cylinder 101. When this cylinder 101 is adopted to the piston unit of the embodiment, for example as shown in FIG. 6, the gap between the piston 35 and the cylinder 101 is drastically increased as the piston 35 has been displaced near to the stroke end where the grooves 102 are formed, so that the resistance of fluid 41 is abruptly decreased at that time. Therefore, the piston 35, which has moved at a comparatively small speed until that time, is allowed to move at a high speed over the region of the stroke near the stroke end. Thanks to this feature, the combination of the cylinder 101 and the piston unit of the invention can minimize the arc discharge between two contacts, when it is used for actuating electric contacts as will be hereinafter described, so as to effectively prevent the early wear or exhaustion of the contact members.

FIGS. 21A to 24C show examples of the valve mechanism usable in the piston unit of the present invention. These valve mechanisms are adapted to control the area of the passage for the liquid filling the cylinder depending on the change in temperature, to compensate for the change in viscosity of the liquid caused by the change of temperature, thereby to ensure a stable operation of the piston unit of the invention irrespective of the change in the ambient temperature.

Needless to say, these valve mechanisms can be substituted for those of the embodiments hereinbefore described.

Four examples of the valve mechanisms will be described hereinunder.

Figure 21A:
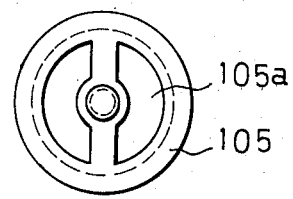
FIG. 21A is a plan view of another example of the piston adopted in the improved piston unit of the invention.
Figure 21B:
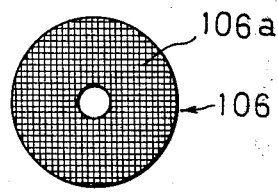
FIG. 21B is a plan view showing an example of the valve member adapted for use in combination with the piston shown in FIG. 21A.

As shown in FIG. 21A, the piston 105 is provided with a large bore 105*a* which is adapted to be opened and closed by a network-like or mesh-like plate-shaped valve member 106 as shown in FIG. 21B. The valve member 106 is constituted by wires 106a made of a metal or a heat-expandable plastic such as polyethylene, and is disposed, for example, in a manner shown in FIG. 11.

Figure 21C:
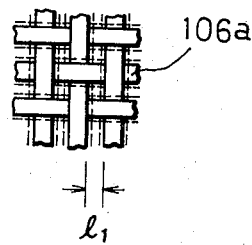
FIG. 21C is an illustration of the operation of the valve member as shown in FIG. 21B.
Figure 22C:
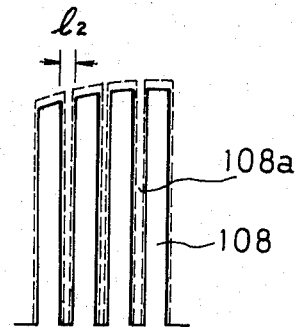
FIG. 22C is an illustration of the operation of the valve member shown in FIG. 22B.

As shown in FIG. 21C, the wires 106a of this valve member 106 are expanded as the temperature rises, as shown by broken lines, so as to reduce the gap $l_1$ between adjacent wires 106a through which the liquid is allowed to pass, thereby to compensate for the fluid resistance attributable to the change in the viscosity of the liquid. To the contrary, as the temperature comes down to increase the viscosity of the liquid, the gaps $l_1$ between the wires 106a are increased to maintain a substantially constant fluid resistance irrespective of the change in temperature.

Figure 22A:
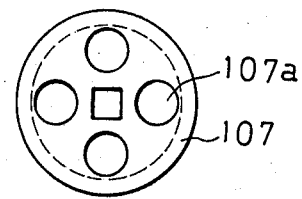
FIG. 22A is a plan view of still another example of the piston adopted in the improved piston unit of the invention.
Figure 22B:
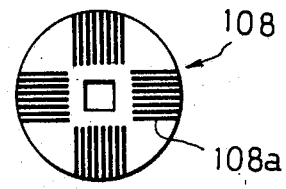
FIG. 22B is a plan view of another example of the valve member for use in combination with the piston shown in FIG. 22A.

In the example shown in FIG. 22A, a plurality of bores 107a are formed in the piston 107 which is adapted to be opened and closed by a valve member 108. The valve member 108 has, as shown in FIG. 22B, slit portions 108a and is made of a metal foil or a heat expandable plastic such as polyethylene. This valve member 108 is disposed, for example, in a manner shown in FIG. 6. The slit 108a which constitutes the passage for the liquid is adapted to be expanded as the temperature rises to provide a narrowed gap $l_2$ shown by the broken line in FIG. 22C. As in the case of the examples shown in FIGS. 21A to 21C, this example may also effectively compensate for the change of fluid resistance due to the change in fluid viscosity attributable to the change in the ambient temperature, thanks to the change of the gap area of the slit 108a.

Figure 23A:
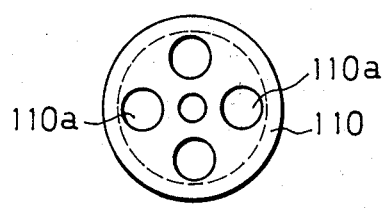
FIG. 23A is a plan view of a further example of the piston usable in the improved piston unit of the invention.
Figure 23B:
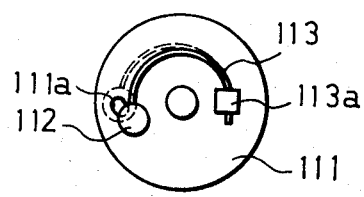
FIG. 23B is a plan view of an example of the valve member for use in combination with the piston shown in FIG. 23A.

Referring now to FIG. 23A, a plurality of bores 110a are formed in the piston 110. These bores 110a are adapted to be opened and closed by means of a valve member 111 which is disposed in a manner shown in FIG. 23C. As shown in FIG. 23B, a small bore 111a constituting the passage of the liquid is formed in the valve member 111, and is adapted to be opened and closed by means of a small auxiliary valve 112. This auxiliary valve 112 is fixed to the free end of a bimetal 113 which in turn is fixed at its other end to the valve member 111. As the temperature rises, the bimetal 113 moves in a manner shown by broken lines so that the auxiliary valve 112 is moved in the direction for closing the small bore 111a. Thus, the opening area of the small bore 111a is changed depending on the change in ambient temperature to effectively compensate for the change of the fluid resistance attributable to the change in liquid viscosity.

In this example of the valve mechanism, the force of fluid acts on the bimetal 113 at a right angle to the direction of deflection of the latter, so that the deflection of the bimetal 113 is changed only by the change in temperature in the cylinder.

Figure 24A:
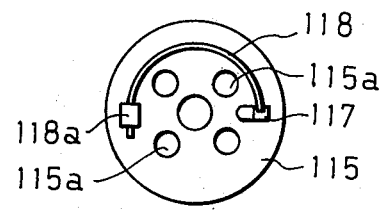
FIG. 24A is a plan view of a still further example of the piston usable in the improved piston unit in accordance with the invention.
Figure 24B:
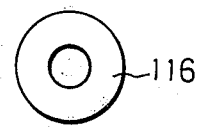
FIG. 24B is a plan view of an example of the valve member usable in combination with the piston shown in FIG. 24A.
Figure 23C:
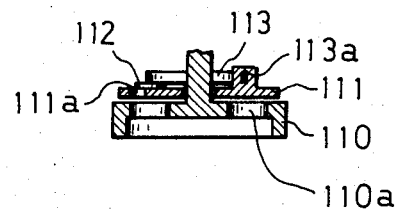
FIG. 23C is front elevational sectional view of a part of the piston and the valve member respectively shown in FIGS. 23A and 23B, in the assembled state.
Figure 24C:
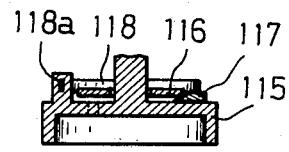
FIG. 24C is a front elevational sectional view of a part of the piston and the valve member shown in FIGS. 24A and 24B, respectively, in the assembled state.

A valve mechanism shown in FIGS. 24A to 24C incorporates a bimetal as in the case of the embodiment shown in FIGS. 23A to 23C. The piston 115 is provided with a plurality of bores 115a adapted to be opened and closed by a valve member 116 which is disposed in a manner shown in FIG. 24C.

A wedge member 117 is interposed between the piston 115 and the valve member 116. More specifically, the wedge member 117 is attached to a bimetal 118 which in turn is fixed at its one end 118a to the piston 115. Therefore, the wedge member 117 is moved toward the peripheral end of the piston 115 as the temperature rises and, accordingly, the gap between the valve member 116 and the piston 115 is reduced. On the other hand, as the temperature comes down, the wedge member 117 is moved toward the center of the piston 115 so as to increase the gap between the latter and the valve member 116. Therefore, when the piston 115 is moved downward, the bore 115a is opened to allow the liquid flow upward with small resistance. To the contrary, when the piston 115 is moved upward, the liquid flows downward through the gap preserved by the wedge member 117 between the valve member 116 and the piston 115. As stated above, this gap is varied, as stated before, depending on the change in temperature, so that the change of the fluid resistance attributable to the change in the fluid viscosity is fairly compensated.

Examples of application of the piston unit of the invention are shown in FIGS. 25 to 30.

Figure 25:
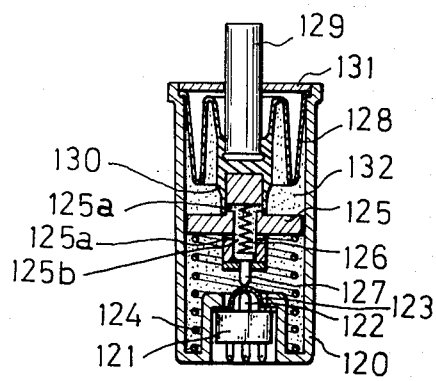
FIG. 25 is a front elevational sectional view of an improved piston unit provided with a switch member.
Figure 26:
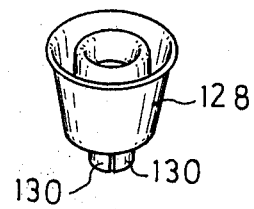
FIG. 26 is a perspective view of a seal member as used in the piston unit shown in FIG. 25, having a valve member thereon.

Referring first to FIG. 25, the piston unit of the invention has a cylinder 120 having a recessed end to which is attached a switch 121. The switch 121 is adapted to be actuated by a push button 122 which projects into the cylinder 120 through a medium of a flexible cover 123 made of rubber. The cover 123 seals liquid-tightly the recessed end of the cyliner 120. The cylinder 120 receives a first spring 124 and a piston 125 adapted to be urged by the first spring 124. At the center of the piston 125, a bore 125b are formed and by-pass holes 125a through which a silicon oil 132 charged in the cylinder 120 passes. A second spring 126 and a switch actuating member 127 are disposed in the bore 125b. This second spring normally urges downwardly the switch actuating member 127 adapted to depress the push button 122 of the aforementioned switch 121. More specifically, this switch actuating member 127 is adapted to actuate the switch 121 by the force of the second spring 126 when the piston 125 has been moved downward beyond a predetermined position. The upper end of the piston 125 is covered by a membrane 128, and an operation rod 129 is operatively connected to the piston through the medium of this membrane 128. As shown in FIG. 26, a by pass valve member 130 which acts as a by pass valve for the by-pass holes 125a of the piston 125 is formed at a portion of the membrane 128 unitarily with the latter. The membrane 128 is crimped liquid-tightly at its peripheral edge by means of the cylinder 120 and the cylinder cap 131.

Figure 27:
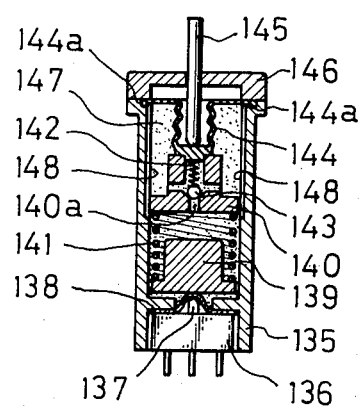
FIG. 27 is a front elevational sectional view of an improved piston unit provided with a switch member, which is a still further embodiment of the invention.

FIG. 27 shows another example in which a switch is also provided at the bottom of the cylinder. More specifically, a switch 136 is fixed to the recessed end of the cylinder 135. The switch 137 is adapted to be actuated by a push button 137 which projects through a cover 138 made of rubber into the cylinder 135. The cylinder 135 mounts slideably an auxiliary piston which constitutes the switch actuating member 139 and also a piston 140. A first spring 141 is interposed between the switch actuating member 139 and the piston 140. A second spring 142 and a ball-shaped valve member 143 are disposed in a through bore 140a formed at the center of the piston 140. Further, at the upper end of the piston 140, a membrane 144 is fixed through which an operation rod 145 is operatively connected to the piston 140. The membrane 144 is crimped liquid-tightly at its peripheral portion 144a between the cylinder 135 and a cylinder cap 146 so as to prevent the silicon oil 147 filled in the cylinder 135 from leaking to the outside of the cylinder 135.

In this embodiment, a plurality of grooves 148 are formed in a part of the inner surface of the cylinder 135 so that the gap between the cylinder 135 and the piston 140 is drastically increased as the latter has been moved near to its stroke end so as to make the piston 140 perform a kind of snapping action. An equivalent effect may be obtained even when the grooves 148 are substituted by the tapered inner surface of the cylinder 135 as shown in FIG. 19.

The piston 140 is moved downward as the operation rod 145 is depressed. By the downward movement of the piston 140, the switch actuating member 139 depresses the push button 137 through the first spring 141.

During the downward movement of the piston 140, the valve member 143 opens the through bore 140a to reduce the fluid resistance. However, as the operation rod 145 is released from the external force, the piston 140 is returned gradually and, as the piston 140 is moved to the position where the grooves 148 are formed, the upward movement of the piston 140 is abruptly accelerated. At this time, the switch actuating member 139 is made to release the push button 137 so as to allow the switch 136 to be reset. The embodiment hereinbefore described in relation to FIG. 25 makes substantially same operation as this embodiment shown in FIG. 27, except that the piston in the latter case makes a quick upward movement in the area near the stroke end due to the provision of the grooves.

As has been described, in the embodiments shown in FIGS. 25 to 27, the movement of the piston is transmitted to the switch member disposed in the recessed end of the cylinder through the switch actuating member, so as to permit a production of compact timer switches having no electronic circuit.

Figure 28:
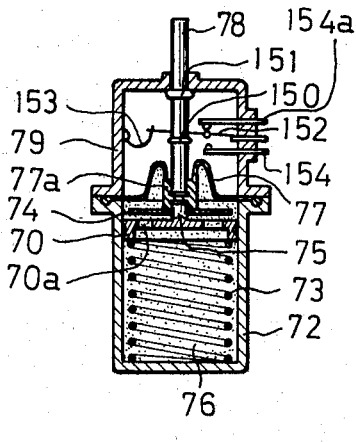
FIG. 28 is a front elevational sectional view of an improved piston unit provided with a switch member, which is still another embodiment of the invention.

FIG. 28 shows another application of the piston unit of the invention, in which the unit shown in FIG. 11 is additionally provided with a switch. The parts and members corresponds to those of the unit shown in FIG. 11 are denoted by the same reference numerals.

In this embodiment, two projections 150, 151 are formed on the operation rod 78 at a predetermined distance from each other. A movable contact 152 is disposed so as to selectively engage these two projections 150, 151. A center-over spring 153 is rotatably attached to the end of the movable contact 152, so as to press the movable contact 152 against stationary contacts 154, 154a. The movable contact 152, stationary contacts 154, 154a and the spring 153 in combination constitute a switch.

As the operation rod 78 is depressed, the projection 150 is moved away from the movable contact 152 but the movable contact 152 is kept in contact with the stationary contact 154a due to the action of the spring 153.

Then, as the operation rod 78 is further depressed to bring the projection 151 into contact with the movable contact 152, the latter is inversed when it has passed the center of the center-over spring 153 and is pressed against the stationary contact 154.

Then, as the operation rod 78 is released from the external force, the piston is gradually returned to the resetting position due to the urging force of the spring disposed in the cylinder 32 and, after the lapse of a predetermined time, the projection 150 on the operation rod 78 operatively connected to the piston 70 presses the movable contact 152 thereby to reset the movable contact 152 into contact with the stationary contact 154a.

It will be seen that, according to this embodiment, it is possible to obtain a less expensive timer switch having a simple construction. Also, the snapping action of the piston at the time of switching of the contact is effected by means of a center-over spring. This arrangement, however, is not exclusive, and the action resembling the snapping action may be made by another members. For example, it is possible to adopt, instead of the center-over spring, the arrangement shown in FIG. 27 having a plurality of grooves in the cylinder so that, when the piston is returned by the urging force of the spring, the fluid resistance is drastically reduced when the piston has reached a point several millimeters ahead of the stroke end. Similarly, as will be clearly understood by those skilled in the art, an equivalent effect will be obtained by the use of a cylinder having a tapered inner surface as shown in FIG. 19, instead of the center-over spring.

Figure 29:
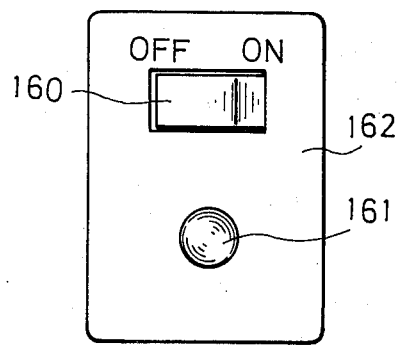
FIG. 29 is a schematic illustration showing an example of application of the piston unit of the invention having a switch member.

FIG. 29 shows an application of the piston unit incorporating a switch member.

Figure 30:
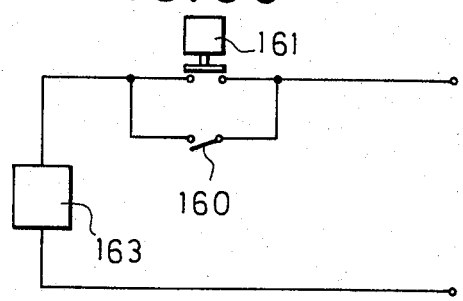
FIG. 30 is a circuit diagram of the example of application of the piston unit of the present invention having a switch member.

A switch unit 161 of the invention as shown in FIGS. 25 to 28 is mounted on a bed 162, and is connected electrically in parallel with a conventional manual switch 160 as shown in FIG. 30. In this system, the supply of electric current to a load 163 is normally under the control of the manual switch 160. However, even when the switch 160 has been opened, the supply of electric current to the load 163 is made by a depression of the switch unit 161. Due to the operational characteristic of the unit switch 161 of the invention as stated before, the electric current supply to the load 163 is interrupted after elapse of a predetermined time from the time of the depression of the switch 161 of the invention.

This arrangement can advantageously used for various purposes. For example, this arrangement may be applied to a lamp switch of a room, such that, when the user has turned the lamp switch off, the lamp is still turned on and the lamp is turned off automatically when he has moved out of the room.

As another application, this arrangement may be adopted in a wall switch for controlling both a lamp and a fan, such that the fan is automatically stopped at a predetermined time after the lamp has been turned off.

Further, it is possible to incorporate the piston unit of the invention in the eject mechanism of a cassette tape recorder. The eject mechanism will then insert the cassette quickly and eject the same gently without any impactive noise.

The piston unit of the invention further finds various other uses such as a device for extinguishing the noises produced by various mechanisms, plungers and the like.

What is claimed is:

1. A piston unit comprising:
   cylinder means having a pair of opposed axial ends and substantially filled with liquid medium;
   piston means slidably mounted in said cylinder means;
   spring means for urging said piston means toward one axial end of said cylinder means;
   an operation rod having one end portion coupled to said piston means so as to be movable therewith and a shank portion extending to the outside of said cylinder means;
   sealing means for sealing said liquid medium in said cylinder means, said sealing means including a flexible membrane having a central portion fixedly interposed between said one end portion of said operation rod and said piston means and a corrugated portion integrally extending from said central portion, said corrugated portion having a peripheral edge region liquid sealingly engaged with said cylinder means such that said membrane seals said liquid medium in said cylinder means and defines a space within the cylinder means which is devoid of the liquid medium, said operation rod being situated in said space fluidly isolated from and not in contact with said liquid medium; and control means for providing that fluid resistance presented by said liquid medium to movement of said piston means toward one of said ends of said cylinder means is different from the fluid resistance presented by said liquid medium to movement of said piston means toward the other one of said ends of said cylinder means, said control means including a through bore formed in said piston means and a valve member coupled to said piston means adapted to open and close said through bore, said valve member being plate-shaped and having a small bore therein situated in substantially opposed relationship to said through bore.

2. A piston unit as claimed in claim 1, wherein said liquid medium is silicon oil.

3. A piston unit as claimed in claim 1, wherein said liquid medium is a mixture of ethylene glycol and water.

4. A piston unit as claimed in claim 1, wherein said membrane is made of synthetic rubber.

5. A piston unit as claimed in claim 1, wherein said spring means includes a coiled spring disposed between the inner end of said cylinder means and said piston means.

6. A piston unit as claimed in claim 1, wherein said spring means includes a coiled spring disposed between the outer end of said cylinder means and said operation rod.

7. A piston unit as claimed in claim 1, wherein said spring means comprises a membrane having a regularly corrugated portion.

8. A piston unit as claimed in claim 1, wherein said central portion of said membrane comprises a hardened portion which is fitted firmly to said piston means, and wherein said corrugated portion extends continuously from said hardened central portion.

9. A piston unit as claimed in claim 1, wherein said central portion of said membrane includes a thick-walled portion at which said membrane is fitted firmly to said piston means, said corrugated portion being integrally connected to said thick-walled portion and wherein said peripheral edge region of said corrugated portion has a bead formed thereon, said bead being fixed liquid-tightly to said cylinder means.

10. A piston unit comprising:
cylinder means having a pair of opposed axial ends and including a switch member and a switch actuating member for actuating said switch member, said cylinder means being substantially filled with liquid medium;
piston means slidably mounted in said cylinder means, said switch actuating member being operatively connected to said piston means;
spring means for urging said piston means toward one axial end of said cylinder means;
an operation rod having one end portion coupled to said piston means so as to be movable therewith and a shank portion extending to the outside of said cylinder means;
sealing means for sealing said liquid medium in said cylinder means, said sealing means including a flexible membrane having a central portion fixedly interposed between said one end portion of said operation rod and said piston means and a corrugated portion integrally extending from said central portion, said corrugated portion having a peripheral edge region liquid sealingly engaged with said cylinder means such that said membrane seals said liquid medium in said cylinder means and defines a space within the cylinder means which is devoid of the liquid medium, said operation rod being situated in said space fluidly isolated from and not in contact with said liquid medium; and control means for providing that fluid resistance presented by said liquid medium to movement of said piston means toward one of said ends of said cylinder means is different from the fluid resistance presented by said liquid medium to movement of said piston means toward the other one of said ends of said cylinder means, said control means including a through bore formed in said piston means and a valve member coupled to said piston means adapted to open and close said through bore.

11. A piston unit as claimed in claim 10, wherein said piston means include a coiled spring adapted for urging said switch actuating member toward said switch member.

12. A piston unit as claimed in claim 10, wherein said spring means is interposed between said piston means and said switch actuating member and wherein said switch actuating member is constituted by a piston adapted to be displaced slideably in said cylinder means and operatively connected to said piston means by means of said spring means.

13. A piston unit comprising:
cylinder means having a pair of opposed axial ends and including a cylinder cap attached thereto, a switch member disposed on said cylinder cap and a switch actuating member adapted to actuate said switch member, said cylinder means being substantially filled with liquid medium;
piston means slidably mounted in said cylinder means;
spring means for urging said piston means toward one axial end of said cylinder means;
an operation rod having one end portion coupled to said piston means so as to be movable therewith and a shank portion extending to the outside of said cylinder means, said switch actuating member of said cylinder means being operatively connected to said operation rod;
sealing means for sealing said liquid medium in said cylinder means, said sealing means including a flexible membrane having a central portion fixedly interposed between said one end portion of said operation rod and said piston means and a corrugated portion integrally extending from said central portion, said corrugated portion having a peripheral edge region liquid sealingly engaged with said cylinder means such that said membrane seals said liquid medium in said cylinder means and defines a space within the cylinder means which is devoid of the liquid medium, said operation rod being situated in said space fluidly isolated from and not in contact with said liquid medium; and control means for providing that fluid resistance presented by said liquid medium to movement of said piston means toward one of said ends of said cylinder means is different from the fluid resistance presented by said liquid medium to movement of said piston means toward the other one of said ends of said cylinder means, said control means including a through bore formed in said piston means and a valve member coupled to said piston means adapted to open and close said through bore.

14. A piston unit comprising:
cylinder means having a pair of opposed axial ends and substantially filled with liquid medium;
piston means slidably mounted in said cylinder means;
spring means for urging said piston means toward one axial end of said cylinder means;
an operation rod having one end portion coupled to said piston means so as to be movable therewith and a shank portion extending to the outside of said cylinder means;
sealing means for sealing said liquid medium in said cylinder means, said sealing means including a flexible membrane having a central portion fixedly interposed between said one end portion of aid operation rod and said piston means and a corrugated portion integrally extending from said central portion, said corrugated portion having a peripheral edge region liquid sealingly engaged with said cylinder means such that said membrane seals said liquid medium in said cylinder means and defines a space within the cylinder means which is devoid of the liquid medium, said operation rod being situated in said space fluidly isolated from and not in contact with said liquid medium; and
control means for providing that fluid resistance presented by said liquid medium to movement of said piston means toward one of said ends of said cylinder means is different from the fluid resistance presented by said liquid medium to movement of said piston means toward the other one of said ends of said cylinder means, said control means including a through bore formed in said piston means and a valve member coupled to said piston means adapted to open and close said through bore, said valve member including a plate located in opposed relationship to said through-bore, said plate being formed of a mesh or network-like material.

15. A piston unit comprising:
cylinder means having a pair of opposed axial ends and substantially filled with liquid medium;
piston means slidably mounted in said cylinder means;
spring means for urging said piston means toward one axial end of cylinder means;
an operation rod having one end portion coupled to said piston means so as to be movable therewith and a shank portion extending to the outside of said cylinder means;
sealing means for sealing said liquid medium in said cylinder means, said sealing means including a flexible membrane having a central portion fixedly interposed between said one end portion of said operation rod and said piston means and a corrugated portion integrally extending from said central portion, said corrugated portion having a peripheral edge region liquid sealingly engaged with said cylinder means such that said membrane seals said liquid medium in said cylinder means and defines a space within the cylinder means which is devoid of the liquid medium, said operation rod being situated in said space fluidly isolated from and not in contact with said liquid medium; and
control means for providing that fluid resistance presented by said liquid medium to movement of said piston means toward one of said ends of said cylinder means is different from the fluid resistance presented by said liquid medium to movement of said piston means toward the other one of said ends of said cylinder means, said control means including a through bore formed in said piston means and a valve member coupled to said piston means adapted to open and close said through bore, said valve member including a plate having slits formed therein, said slits being located in opposed relationship to said through bore formed on said piston means.

16. A piston unit comprising:
cylinder means having a pair of opposed axial ends and substantially filled with liquid medium;
piston means slidably mounted in said cylinder means;
spring means for urging said piston means toward one axial end of said cylinder means;
an operation rod having one end portion coupled to said piston means so as to be movable therewith and a shank portion extending to the outside of said cylinder means;
sealing means for sealing said liquid medium in said cylinder means, said sealing means including a flexible membrane having a central portion fixedly interposed between said one end portion of said operation rod and said piston means and a corrugated portion integrally extending from said central portion, said corrugated portion having a peripheral edge region liquid sealingly engaged with said cylinder means such that said membrane seals said liquid medium in said cylinder means and defines a space within the cylinder means which is devoid of the liquid medium, said operation rod being situated in said space fluidly isolated from and not in contact with said liquid medium; and
control means for providing that fluid resistance presented by said liquid medium to movement of said piston means toward one of said ends of said cylinder means is different from the fluid resistance presented by said liquid medium to movement of said piston means toward the other one of said ends of said cylinder means, said control means including a through bore formed in said piston means and a valve member coupled to said piston means adapted to open and close said through bore, said valve member including a plate provided with a small bore located in opposed relationship to said through bore, and a bimetallic member having one end fixed to said plate and a closure member fixed to the other end of said bimetallic member adapted to selectively open and close said small bore.

17. A piston unit comprising:
cylinder means having a pair of opposed axial ends and substantially filled with liquid medium;
piston means slidably mounted in said cylinder means including a bimetallic member fixed at one of its ends thereto and a small plate attached to the free end of said bimetallic member;
spring means for urging said piston means toward one axial end of said cylinder means;
an operation rod having one end portion coupled to said piston means so as to be movable therewith and a shank portion extending to the outside of said cylinder means;

sealing means for sealing said liquid medium in said cylinder means, said sealing means including a flexible membrane having a central portion fixedly interposed between said one end portion of said operation rod and said piston means and a corrugated portion integrally extending from said central portion, said corrugated portion having a peripheral edge region liquid sealingly engaged with said cylinder means such that said membrane seals said liquid medium in said cylinder means and defines a space within the cylinder means which is devoid of the liquid medium, said operation rod being situated in said space fluidly isolated from and not in contact with said liquid medium; and control means for providing that fluid resistance presented by said liquid medium to movement of said piston means toward one of said end of said cylinder means is different from the fluid resistance presented by said liquid medium to movement of said piston means toward the other one of said ends of said cylinder means, said control means including a through bore formed in said piston means and a valve member coupled to said piston means adapted to open and close said through bore and wherein the opening and closing of said through bore is controlled by said small plate which in turn is operated by said bimetallic member.

18. A piston unit comprising:

cylinder means having a pair of opposed axial ends and substantially filled with liquid medium;

piston means slidably mounted in said cylinder means;

spring means for urging said piston means toward one axial end of said cylinder means;

an operation rod having one end portion coupled to said piston means so as to be movable therewith and a shank portion extending to the outside of said cylinder means;

sealing means for sealing said liquid medium in said cylinder means, said sealing means including a flexible membrane having a central portion fixedly interposed between said one end portion of said operation rod and said piston means and a corrugated portion integrally extending from said central portion, said corrugated portion having a peripheral edge region liquid sealingly engaged with said cylinder means such that said membrane seals said liquid medium in said cylinder means and defines a space within the cylinder means which is devoid of the liquid medium, said operation rod being situated in said space fluidly isolated from and not in contact with said liquid medium; and control means for providing that fluid resistance presented by said liquid medium to movement of said piston means toward one of said ends of said cylinder means is different from the fluid resistance presented by said liquid medium to movement of said piston means toward the other one of said ends of said cylinder means, said control means including a through bore formed in said piston means and a valve member coupled to said piston means adapted to open and close said through bore, said valve member being plate shaped and fixed at one end to said piston means.

* * * * *